United States Patent [19]
Ban et al.

[11] Patent Number: 5,236,052
[45] Date of Patent: Aug. 17, 1993

[54] METHOD AND AN APPARATUS FOR CONTROLLING STRESS IN A MEMBER AND A FASTENER HAVING STRESS INDICATING MEANS

[75] Inventors: Keisuke Ban; Masakazu Sato, both of Saitama, Japan

[73] Assignee: Honda Giken Kogyo Kabushiki Kaisha, Tokyo, Japan

[21] Appl. No.: 131,109

[22] Filed: Dec. 10, 1987

[30] Foreign Application Priority Data

Dec. 27, 1986 [JP] Japan ................. 61-314027

[51] Int. Cl.[5] ............................................. B23Q 5/00
[52] U.S. Cl. ....................................... 173/176; 173/1; 29/407
[58] Field of Search ...................... 173/12, 1, 2; 73/862.41, 862.45, 862.44, 862.47, 862.59; 29/407; 411/8, 9, 11, 14

[56] References Cited

U.S. PATENT DOCUMENTS

| | | | |
|---|---|---|---|
| 4,333,220 | 6/1982 | Aspers | 29/407 |
| 4,347,024 | 8/1982 | Coldren | 411/11 |
| 4,554,980 | 11/1985 | Doniwa | 173/12 |
| 4,686,859 | 8/1987 | Wallace | 411/14 X |
| 4,709,182 | 11/1987 | Wenske et al. | 73/862.41 |
| 4,730,254 | 3/1988 | Voden, Jr. | 173/12 X |

*Primary Examiner*—Mark Rosenbaum
*Assistant Examiner*—Willmon Fridie, Jr.
*Attorney, Agent, or Firm*—Nixon & Vanderhye

[57] ABSTRACT

Proposed is a method and an apparatus for controlling stress applied to a fastener member or the like by a fastening tool by detecting an elastic wave generated in the member as the stress, for instance in the form of an axial force, is applied thereto and by activating the fastening tool according to the detection results. Since the elastic wave or the acoustic wave accurately reflects the internal state of stress in the fastener member, a very precise control of the stress in the fastener member is made possible. If a plurality of vibration sensors are used, an exact identification of the source of elastic wave can be made and the measurement accuracy can be improved. When an indicator member having a property to emit a pronounced elastic wave is attached to the fastener, it is possible to freely adjust the target axial force as desired.

14 Claims, 2 Drawing Sheets

METHOD AND AN APPARATUS FOR CONTROLLING STRESS IN A MEMBER AND A FASTENER HAVING STRESS INDICATING MEANS

TECHNICAL FIELD

The present invention relates to a method apparatus for controlling stress in a member and in particular to a method and an apparatus for controlling an axial force in a member such as a threaded bolt as it is being fastened by a fastening tool. Additionally, the present invention relates to a fastener having stress indicating means which is adapted to favorably implement the method of the present invention.

BACKGROUND OF THE INVENTION

Conventionally, the axial forces of threaded bolts have been controlled according to the fastening torques, and torque wrenches of various sorts have been widely used for this purpose. In this method, the axial force is simply estimated from the fastening torque. But according to this method, the estimated axial force may be a poor approximation of the actual value depending on the circumstances. Certain torque coefficients may be taken into account to compensate for various external factors. However, since the selection of appropriate torque coefficients is very critical for accurate estimation of the axial force and the torque coefficients are very much affected by various factors such as the dimensional precision of the threaded portion of the bolt and the condition of the seat surface of the bolt head, the general surface conditions of the members to be fastened, the lubrication conditions and so on, which could vary a great deal depending on the circumstances, it is difficult to achieve a high level of accuracy.

Japanese patent laid-open publication No. 50-140178 discloses a method of turning an already fastened threaded bolt or a nut over a certain angle and estimating the axial force in the bolt according to a calibration curve which gives the relationship between this angle and the axial force. According to this method, the measured values of the axial force are not affected by external factors so much as the method which depends on the torque coefficient, and an axial force measurement of a relatively high precision is possible. However, according to this method, the conditions preceding the turning of the bolt or the nut are required to be adjusted according to certain torque control criteria which are based on the concept of the so-called snug torque and controlling these conditions presents a major problem.

Japanese patent laid-open publication No. 61-19572 discloses a method of controlling the axial force based on the torque gradient method which basically involves the detection of the beginning of the plastic range of the deformation of the bolt. This method is based on the intrinsic characteristics of the material of the bolt itself but, at the same time, requires the recording of the change in the torque coefficient and the axial force must be estimated from this torque coefficient. Therefore, this method cannot necessarily assure a sufficiently high level of accuracy.

Japanese patent laid-open publication 51-43180 discloses a method of estimating the axial force of a bolt according to the change in the resonance frequency of the bolt which is known to change according to the state of stress in the bolt. This method is very powerful in theory but there are some problems with the detection accuracy of the sensor and the reproducibility of the conditions of radiation and reflection of ultrasonic sound tends to be poor. Therefore, achieving a high level of accuracy with this method is difficult. Also, this method requires expensive facilities and equipment for measurement.

BRIEF SUMMARY OF THE INVENTION

In view of such shortcomings of the prior art, a primary object of the present invention is to provide a method of controlling stress applied to a member by a fastening tool or the like which can achieve a high level of accuracy using simple measurement facilities and equipment.

Another object of the present invention is to provide a method of controlling the state of stress in a member which is relatively free from interferences of external sources.

Yet another object of the present invention is to provide an apparatus and a fastener which are suitable for implementing the method of the present invention.

According to the present invention, such objects can be achieved by providing a method of controlling stress in a member as a fastening tool is applied thereto, characterized in that: an elastic wave generated in the member by stress in the member is detected and an actuating force of the fastening tool is controlled according to a result of detecting the elastic wave.

This method can be conveniently implemented if one provides an apparatus for controlling an axial force applied to a member by a fastening tool, comprising: a vibration sensor which is acoustically coupled with the member; a control unit for comparing a signal received from the vibration sensor with a certain reference; a drive unit which activates and stops an action of the fastening tool according to an output from the control unit. Preferably, this method or this apparatus may be used in combination with a fastener for connecting two members by being subjected to an axial force, comprising indicator means which is made of a material having a property of emitting pronounced elastic wave and is attached to the fastener so as to axially deform with the fastener.

If the elastic wave is detected at at least two locations and a source of the elastic wave is located from a time difference in arrival of the elastic wave at the two or more locations according to the theory for locating the focus of an earthquake, the accuracy of measurement can be improved.

If the elastic wave is generated from indicator means, attached to the member, having a property of emitting a pronounced elastic wave, the adjustment of the target level of stress is simplified. Preferably, the indicator means is made of a relatively brittle material, or a material having a lower yielding point than a material of the fastener. If a plurality of indicator means having different elastic wave properties are used, a plurality of target levels may be set up as desired.

The reference for determining the detection of an elastic wave may be based on a certain threshold level or a pattern of the detected elastic wave.

Since the elastic wave resulting from the internal change in the material is detected, a high level of accuracy can be obtained. Since only a receiving sensor is required for detecting this elastic wave, the facilities and equipment for measurement are simplified.

BRIEF DESCRIPTION OF THE DRAWINGS

Now the present invention is described in the following with reference to the appended drawings, in which.

DETAILED DESCRIPTION OF THE PREFERRED EMBODIMENTS

Conventionally, it has been known that elastic waves are generated in metallic materials or the like as a result of change in the internal structure of the material involving release of energy such as plastic deformation, crack propagation, movement of dislocations, crystal growth, allotropic transformation and so forth. This phenomenon is called as the "acoustic emission" (AE). The AE is a direct result of the change in the state of the elastic energy of the material undergoing a deformation and is typically detected when elastic energy is released during the deformation of material which may involve movement of dislocations, propagation of cracks and so on in the material. Thus, the acoustic emission directly indicates the dynamic changes in the internal structure of the material.

Figure 1:
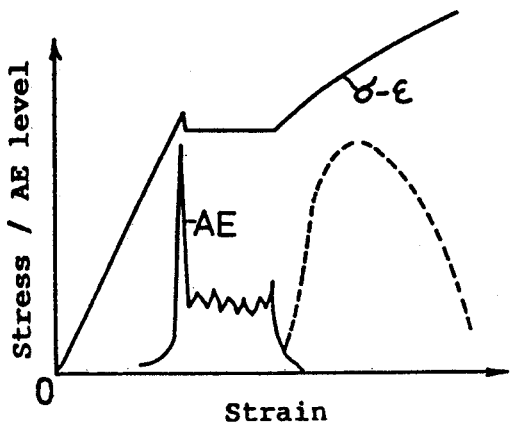
FIGS. 1 to 5 are graphs representing several categories of the patterns of AE wave generation.
Figure 2:
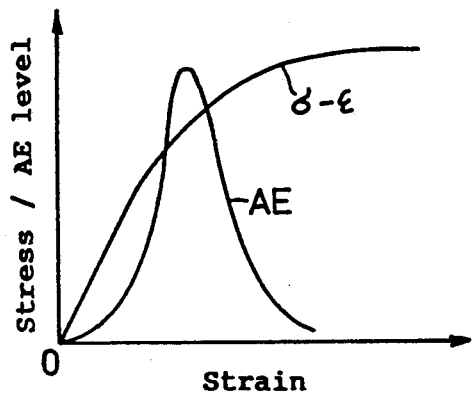
Figure 3:
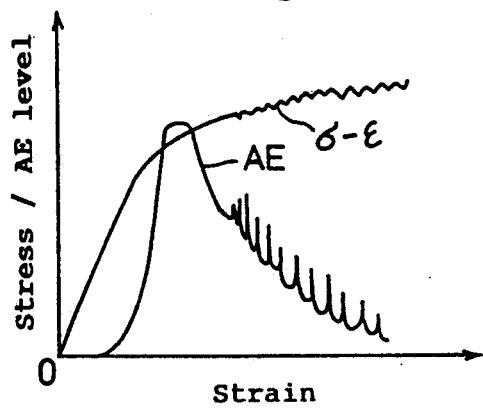
Figure 4:
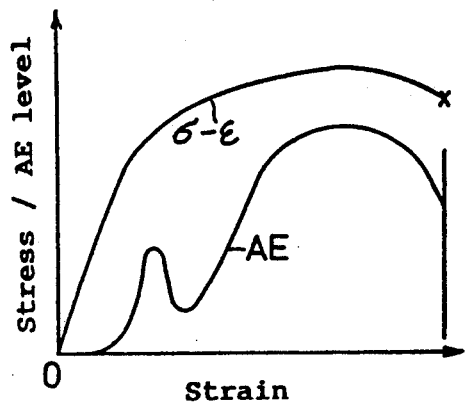
Figure 5:
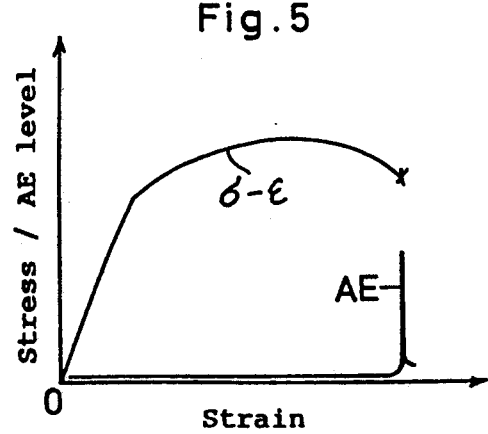

FIGS. 1 to 5 show five categories of the acoustic emission as defined by Eisenblaetter in the paper presented April, 1979 in Bad Nauheim, West Germany, at a meeting organized by the Deutsche Gesellschaft fuer Metallkunde e. V.. Category 1 is the AE which is seen in the deformation of materials such as steel which involves the Luder's lines (Hartmann lines) and displays a high peak in the vicinity of the yielding point. Category 2 is the AE which is seen in the deformation of pure metals having the face-centered cubic lattice structure such as copper and aluminum and likewise displays a high peak in the vicinity of their yielding points Category 3 which is shown in FIG. 3 is the AE resulting from the serration (which is sometimes called as dynamic strain aging or, alternatively, the Portevin - Le Chatelier effect) found in Al-Mg and alpha-brass alloys. Category 4 is the AE which is seen in materials such as age hardening alloys, high carbon steels, titanium alloys and so forth and displays a peak after the yielding point has been passed. Category 5 is the AE which appears only in the vicinity of the yielding point or the fracture point and is seen in stainless steel and high steel alloys. Thus, in most metallic materials and alloys, the AE tends to be conspicuous in the vicinity of the yielding point. Since fasteners such as threaded bolts are generally fastened up nearly to their yielding points, the generation of the AE wave gives a convenient indication that the fastener has been fastened to an intended limit.

Figure 6:
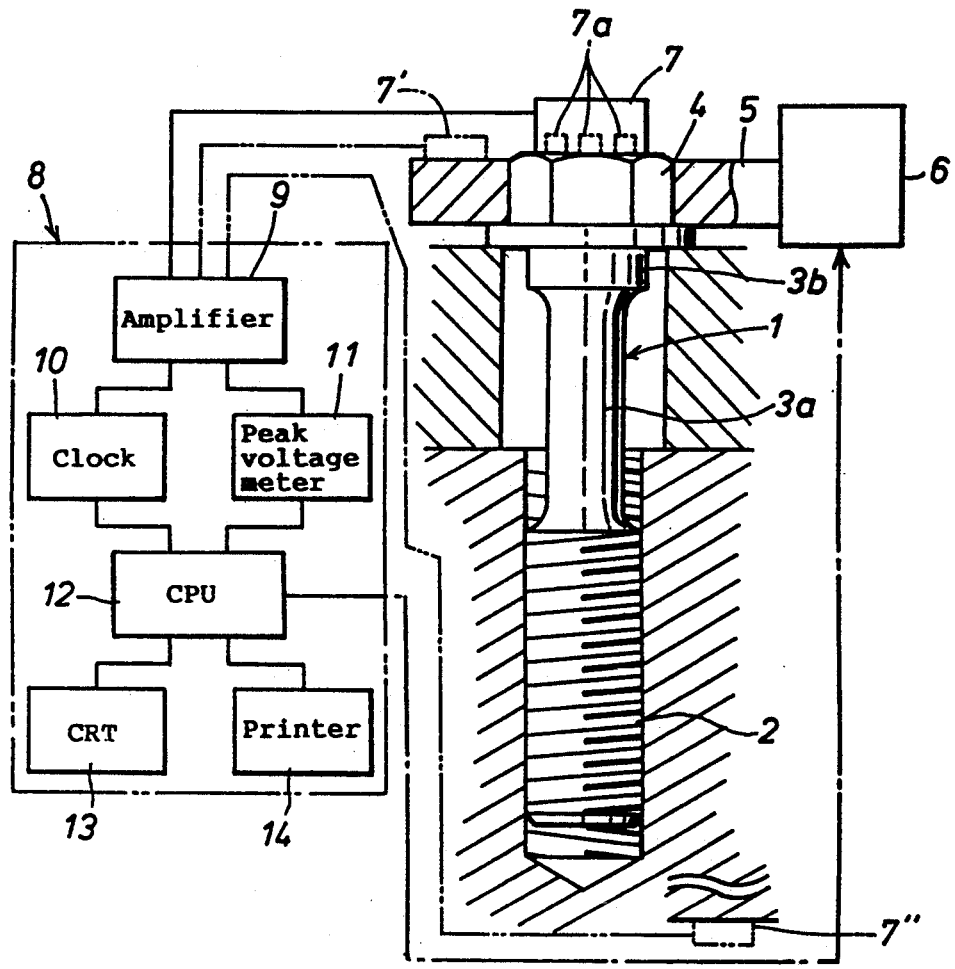
FIG. 6 is a block diagram showing an apparatus according to the present invention.

FIG. 6 shows an embodiment of the device for controlling the axial force in fastening threaded bolts according to the present invention. The bolt 1 is provided with a threaded portion 2, a neck 3 and a head 4. The neck 3 generally has a smooth surface and consists of a small-diameter portion 3a which is smaller in diameter than the threaded portion 2 and a large-diameter portion 3b which has a substantially same diameter as the external diameter of the threaded portion 2. A fastening tool 5 which is power driven by a drive unit 6 is engaged to the head 4 of the bolt 1. Further, a vibration sensor 7 is attached to the head of the bolt 1 and the output of this sensor is supplied to a control unit 8. The vibration sensor 7, preferably, comprises three sensor elements 7a which are spatially displaced from each other. The output of the control unit 8 is supplied to the drive unit 6 so that the drive unit 6 be controlled according to the AE detected by the vibration sensor 7.

The control unit 8 is provided with an amplifier 9 which amplifies the signal from the vibration sensor 7 and the output of the amplifier 9 which indicates the time history of the AE is supplied to a CPU 12 by way of a clock 10 for determining the location of the source of the AE wave and a peak voltage meter 11 for detecting the AE wave.

In a similar fashion as locating the focus of an earthquake, if the time differences between the arrivals of an identical elastic wave at three different locations of the sensor elements 7a are determined, the exact location of the source of the elastic wave can be identified as a point of intersection between three hyperboloids which are given as surfaces defining constant differences in the distances from given two of the sensor elements. If only two sensor elements are used, the location of the source of the elastic wave may be narrowed to a hyperboloid and a region of intersection between this hyperboloid and the threaded bolt within which the AE wave is generated will give a good estimate of the location of the source of the AE wave. To allow a good estimate of the location of the source of the AE wave, the sensor elements 7a may be arranged in suitable manner; they may be placed on the threaded bolt 1 itself as indicated by numeral 7, on the fastening tool as indicated by numeral 7', on the member to be fastened or to be attached to another member with the threaded bolt 1 as indicated by numeral 7" or on these members in a desired combination.

This arrangement can also be used to eliminate noises from the detected signal by accepting only the signal emitted from a predetermined location. For instance, if the three signals from the three sensor elements 7a are connected to three inputs of an AND device, then the output of the AND device will extract a signal which originated from a fixed location.

The CPU 12 controls the fastening torque of the bolt 1 by detecting a certain pattern of the AE wave according to a certain reference and stopping the action of the drive unit 6 upon detection of the pattern. The display unit 13 and the printer 14 are provided for the convenience of the operator to monitor the action of the control device 8. Alternatively, it is possible to simply set a reference consisting of a threshold value of the acoustic emission level and to stop the fastening tool when the detected acoustic emission has exceeded this threshold level.

Now the process of controlling the axial force of the bolt with the above described control apparatus is described in the following.

First of all, a calibration is performed by preparing an elongation versus axial force (spring constant) graph for a specific bolt and detecting the AE wave to obtain the relationship between the axial force of the bolt and the pattern of the generated AE wave. The material of the bolt and the heat treatment applied thereto as well as the shape and the dimensions of the bolt may be determined so that a pronounced AE wave be generated. For instance, a small diameter portion may be provided in the neck of the bolt as shown FIG. 6 so as to cause a stress concentration therein and limit the region which could be the location of the source of the AE wave. This will increase the accuracy of the measurement of the axial force of the bolt. Generally speaking, the AE wave tends to be pronounced in materials which have clear yielding points.

Then, according to the result of the AE wave detection while the bolt is actually being fastened, the action of the drive unit 6 is stopped and the axial force is determined according to the calibration results. The drive unit 6 may comprise a power source of an arbitrary kind, hydraulic, pneumatic or electric, which can be stopped in a short time.

To avoid the measurement inaccuracy which may arise from the noises arising from the threaded portion of the bolt, the surfaces or the nut runner, it is desirable to increase the reliability of measurement by defining threshold values to the axial force, the AE energy, the rotational angle of the bolt and so on as required, or to count the number of the occurrences of the AE wave (events). If a plurality of vibration sensors are used at the same time, the location of the source of the AE wave can be precisely identified according to the theory for determining the focus of an earthquake, and this will contribute to the improvement of the accuracy of measurement.

According to this embodiment, since the AE wave is typically generated at the beginning of the plastic range of the deformation of a bolt when the spring constant of the bolt drops sharply and since the bolt is typically fastened up to its plastic range, this is favorable for improving the accuracy of the control of the axial force.

Figure 7:
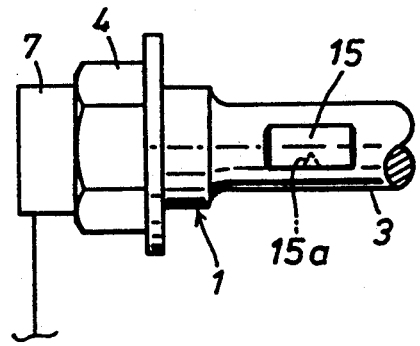
FIG. 7 is a side view of a threaded bolt provided with the indicator means.
Figure 8:
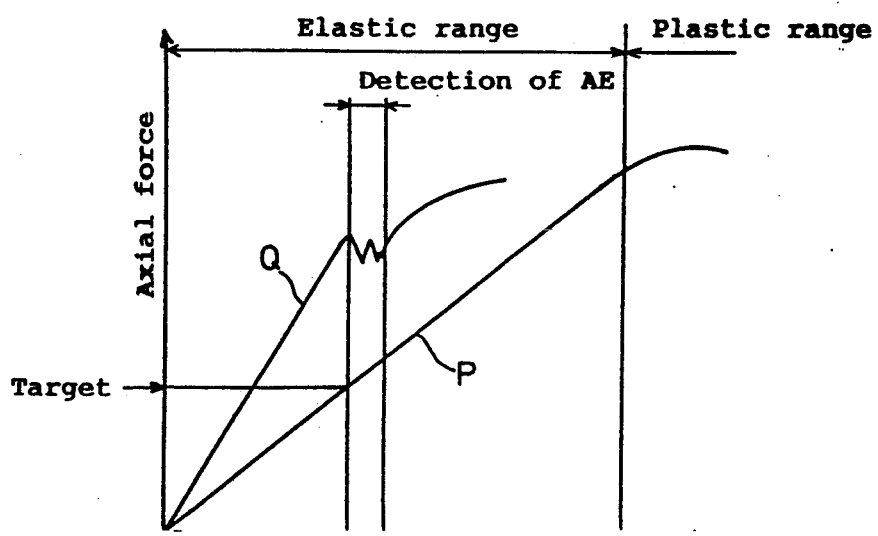
FIG. 8 is a graph showing the properties of the threaded bolt shown in FIG. 7.

FIG. 7 shows a bolt which is suited for fastening in the elastic range. An indicator member 15 is attached to the neck 3 of this bolt 1 by welding, flame spraying, plating and other means. As shown in FIG. 8, the material of this indicator member 15 is selected in such a manner that even when the material of the bolt 1 is elongated within the elastic range as indicated by a curve P the indicator member 15 reaches the yielding point as represented by a curve Q with the result that the axial force of the bolt 1 in the elastic range can be controlled according to the AE wave generated from the indicator member 15. Therefore, by appropriate selection of the material of the indicator member 15, the pattern of the AE wave that will be generated and the target value of the axial force that is to be controlled can be freely determined. This bolt 1 can be used repeatedly with an appropriate selection of the material for the indicator member 15.

It is also possible to use a brittle material such as a ceramic material for the indicator member 15. Thereby, the accuracy of measurement can be improved and the detection of the AE wave is facilitated through detection of the AE wave resulting from a rupture. Furthermore, by providing a slit or a notch 15a (as indicated with an imaginary line) for causing an early rupture in the indicator member 15, an even more pronounced AE wave can be detected. In that case, the indicator member 15 can be used for only once and cannot be used repeatedly. However, if a plurality of indicator members 15 having different properties are attached to the bolt 1, it is possible to use the bolt repeatedly even when brittle material is used for the indicator members 15. In general, if a plurality of indicator members having different properties are attached to the bolt, it is possible to identify a plurality of axial force values.

It is not necessary to attach the vibration sensor directly to the member whose axial force is to be measured. The sensor may be attached to other members adjacent to the member in question, the fastening tool or other parts of the measurement system. The fastening tool is not limited by the one described above but may also be those which become free or notify the user with auditory, visual or tactile means when a certain axial force has been reached.

Although the above embodiments were limited to those involving threaded bolts, the present invention can be applied to any structural member which is brought under stress by a controllable external force. Thus, according to the present invention, the axial force of a threaded bolt or the like can be accurately controlled with relatively simple facilities and the present invention provides a great advantage in this technical field.

What we claim is:

1. An apparatus for controlling an axial force applied to a member by a fastening tool, comprising:
   a vibration sensor comprising a means responsive to an elastic wave generated solely by said member;
   means for acoustically coupling said sensor with said member;
   a control unit for comparing a signal received from said vibration sensor with a certain reference; and
   a drive unit which activates and stops an action of said fastening tool according to an output from said control unit.

2. An apparatus as defined in claim 1, wherein said vibration sensor comprises at least a pair of vibration sensors and said control unit comprises a clock which measures any time difference of detection of a same elastic wave by said vibration sensors, and means for computing a location of a source of said elastic wave in said member from said time difference.

3. An apparatus as defined in claim 1, wherein said reference consists of a threshold level.

4. An apparatus as defined in claim 1, wherein said reference consists of a pattern of elastic wave.

5. An apparatus as defined in claim 1, further comprising display means for producing a sensible indication that a certain axial force has been produced in said member according to an output from said sensor.

6. An apparatus as defined in claim 1, wherein said vibration sensor is directly attached to said member.

7. An apparatus as defined in claim 1, wherein said vibration sensor is attached to said member via another solid member.

8. A method for controlling stress in a member when a fastening tool is applied thereto, comprising the steps of:
   applying an actuating force to said fastening tool causing an increasing stress in said member;
   detecting an elastic wave produced in said member as a result of said stress reaching a predetermined level; and
   controlling said actuating force in response to detection of said elastic wave.

9. A method as defined in claim 8, wherein said member comprises a fastener member.

10. A method as defined in claim 8, wherein said member comprises a main member whose stress is to be controlled, and an indicator means, attached to said main member, for producing a pronounced elastic wave when said main member is stressed to a predetermined level.

11. A method as defined in claim 5, wherein said elastic wave is detected at at least two locations and a source of said elastic wave is located from a time difference in arrival of said elastic wave at said two or more locations.

12. A method as defined in claim 8, wherein said actuating force is controlled when a level of said detected elastic wave has exceeded a certain threshold level.

13. A method as defined in claim 8, wherein said actuating force is controlled when a certain pattern of elastic wave has been detected.

14. An apparatus for controlling an axial force applied to a member by a fastening tool, comprising:

a vibration sensor which is in solid contact with said member and responsive to an elastic wave generated solely by said member;

a control unit for comparing a signal, received from said vibration sensor, to a predetermined reference and for providing an output when said signal equals said reference; and a power transmission unit in said fastening tool for increasing axial force applied to said member, said power transmission unit including means, responsive to said output from said control unit, for disconnecting said power transmission unit from a power source.

* * * * *